United States Patent
Miura

(10) Patent No.: US 12,327,158 B2
(45) Date of Patent: Jun. 10, 2025

(54) PROCESSING APPARATUS FOR OUTPUTTING INFORMATION FOR A PASSENGER OF A WALK-THROUGH GATE

(71) Applicant: NEC Corporation, Tokyo (JP)

(72) Inventor: Kazuki Miura, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 18/023,652

(22) PCT Filed: Sep. 2, 2020

(86) PCT No.: PCT/JP2020/033197
§ 371 (c)(1),
(2) Date: Feb. 27, 2023

(87) PCT Pub. No.: WO2022/049658
PCT Pub. Date: Mar. 10, 2022

(65) Prior Publication Data
US 2023/0342570 A1  Oct. 26, 2023

(51) Int. Cl.
*G06K 7/10* (2006.01)
(52) U.S. Cl.
CPC .................. *G06K 7/10366* (2013.01)
(58) Field of Classification Search
None
See application file for complete search history.

(56) References Cited

U.S. PATENT DOCUMENTS

| | | | |
|---|---|---|---|
| 2003/0197612 A1* | 10/2003 | Tanaka | G08B 13/2462 340/8.1 |
| 2006/0133653 A1* | 6/2006 | Sznba | A61B 5/11 382/103 |
| 2010/0288837 A1 | 11/2010 | Tomiyama et al. | |
| 2018/0061159 A1* | 3/2018 | Saso | G07C 9/37 |
| 2020/0019948 A1 | 1/2020 | Okamoto | |

FOREIGN PATENT DOCUMENTS

| | | | |
|---|---|---|---|
| EP | 2541506 A1 * | 1/2013 | ............ B61L 23/041 |
| JP | H08-329292 A | 12/1996 | |
| JP | 2005-242795 A | 9/2005 | |
| JP | 2007-206996 A | 8/2007 | |
| JP | 2008-203974 A | 9/2008 | |

(Continued)

OTHER PUBLICATIONS

International Search Report for PCT Application No. PCT/JP2020/033197, mailed on Oct. 20, 2020.

(Continued)

*Primary Examiner* — Suezu Ellis

(57) ABSTRACT

An information processing apparatus (100) includes: a reading result acquisition unit (102) that acquires a reading result from a gate including a reading unit which reads a wireless communication tag provided to a product; a detection result acquisition unit (104) that acquires a detection result from a detection unit which detects a person who passes through the gate; and an output processing unit (106) that causes an output unit to perform a predetermined output when there is no reading of the wireless communication tag within a predetermined period around a timing at which the detection unit detects the person.

15 Claims, 15 Drawing Sheets

(56) References Cited

FOREIGN PATENT DOCUMENTS

| | | | |
|---|---|---|---|
| JP | 2010-267011 A | 11/2010 | |
| JP | 2011-233133 A | 11/2011 | |
| JP | 2018-136673 A | 8/2018 | |
| JP | 2019-113906 A | 7/2019 | |
| JP | 2020-057109 A | 4/2020 | |
| JP | 2020-074082 A | 5/2020 | |
| WO | WO-03065257 A2 * | 8/2003 | ............. G07B 15/02 |

OTHER PUBLICATIONS

JP Office Action for JP Application No. 2022-546768, mailed on Sep. 26, 2023 with English Translation.

* cited by examiner

A1 TWO ADULTS PASS
THROUGH GATE

A2 WHEN PARENT AND
CHILD ENTER GATE

A3 WHEN PERSON WITH
BABY CARRIAGE/SUITCASE
OR THE LIKE ENTERS

B1 PRODUCT IS LOCATED ABOVE GATE

B2 JUMP OVER FLAPPER GATE

B3 BODY IS LOCATED IN GATE, AND PRODUCT IS LOCATED OUTSIDE ENTRANCE

B4 BODY IS LOCATED IN GATE, AND PRODUCT IS LOCATED OUTSIDE EXIT

B5 BODY IS LOCATED IN GATE, AND PRODUCT IS LOCATED OUTSIDE RIGHT/LEFT

B6 PERSON HOLDS PRODUCT WITH HAND WITHOUT PUTTING PRODUCT IN BAG

C1 PRODUCT IS LOCATED ABOVE GATE

C2 PRODUCT IS LOCATED OUTSIDE EXIT

C3 PERSON PASSES THROUGH GATE BY FORCE

C4 PERSON HOLDS A PART OF PRODUCT WITH HAND

PROCESSING APPARATUS FOR OUTPUTTING INFORMATION FOR A PASSENGER OF A WALK-THROUGH GATE

This application is a National Stage Entry of PCT/JP2020/033197 filed on Sep. 2, 2020, the contents of all of which are incorporated herein by reference, in their entirety.

TECHNICAL FIELD

The present invention relates to an information processing apparatus, an information processing method, and a program.

BACKGROUND ART

One example of a gate apparatus applied to an automatic ticket gate of a station and the like is described in Patent Document 1. The gate apparatus in Patent Document 1 determines a dishonest user by capturing a user during a dishonest passage, based on an output of a dishonesty distinction means for distinguishing a dishonest passage of a user.

A condition for being distinguished as a dishonest passage is when an invalid ticket in which a section of line traveled, a validity period, or the like is invalid is put into a slot of an automatic ticket gate, or when a user enters a gate without putting a passenger ticket into a slot. Furthermore, it is described that a sensor that detects a user who attempts to jump over a gate or a sensor that detects forcible opening of a gate is provided, and the user is captured when the sensor detects jumping over of the gate or forcible opening of the gate. It is also described that a video in which behavior of a dishonest user is captured is displayed on a monitor.

Patent Document 2 describes a system for detecting a person who takes out a product in a dishonest manner such as shoplifting. The system in Patent Document 2 detects a product to which a tag without a recording change is attached, emits a detection signal, captures a product carrier who passes through a gate, stores the detection signal in association with a captured image, transmits image data to a portable terminal, and displays the image data on the portable terminal.

Patent Document 3 describes an apparatus for reading and processing a wireless tag for a shopper to perform settlement while a product is placed in a shopping cart. Patent Document 4 describes a shoplifting preventing system using a gate including a camera. The gate in Patent Document 4 processes a warning when the gate detects a tag attached to a product, also captures a passage in front of the gate, detects a person included in a captured image, searches for a video captured by a plurality of surveillance cameras of the system, and displays a video determined to capture the target person by the search.

Patent Document 5 describes a system for detecting dishonest behavior such as shoplifting of a customer in a store.

RELATED DOCUMENTS

Patent Documents

Patent Document 1: Japanese Patent Application Publication No. H8-329292
Patent Document 2: Japanese Patent Application Publication No. 2005-242795
Patent Document 3: Japanese Patent Application Publication No. 2010-267011
Patent Document 4: Japanese Patent Application Publication No. 2011-233133
Patent Document 5: Japanese Patent Application Publication No. 2019-113906

SUMMARY OF INVENTION

Technical Problem

The gate apparatuses described above detect, capture, and notify dishonest behavior of a user, but cannot guide a correct passage method of a gate to a user who attempts to pass through the gate by a wrong use method without malice and a user who does not know the correct passage method of the gate.

The present invention has been made in view of the circumstance described above, and an object thereof is to be able to inform an appropriate passage method of a gate according to a situation of a user, and improve reading accuracy of a wireless communication tag provided to a product.

Solution to Problem

In each aspect according to the present invention, each configuration below is adopted in order to solve the above-mentioned problem.

A first aspect relates to an information processing apparatus.

The information processing apparatus according to the first aspect includes:
  a reading result acquisition unit that acquires a reading result from a gate including a reading unit which reads a wireless communication tag provided to a product;
  a detection result acquisition unit that acquires a detection result from a detection unit for detecting a person who passes through the gate; and
  an output processing unit that causes an output unit to perform a predetermined output when there is no reading of the wireless communication tag within a predetermined period around a timing at which the detection unit detects the person.

A second aspect relates to an information processing method executed by at least one computer.

The information processing method according to the second aspect includes,
  by a computer:
  acquiring a reading result from a gate including a reading unit which reads a wireless communication tag provided to a product;
  acquiring a detection result from a detection unit which detects a person who passes through the gate; and
  causing an output unit to perform a predetermined output when there is no reading of the wireless communication tag within a predetermined period around a timing at which the detection unit detects the person.

Note that, another aspect according to the present invention may be a program causing at least one computer to execute the method in the second aspect, or may be a computer-readable storage medium that stores such a program. The storage medium includes a non-transitory tangible medium.

The computer program includes a computer program code causing a computer to execute the information processing method on the information processing apparatus when the computer program code is executed by the computer.

Note that, any combination of the components above and expression of the present invention being converted among a method, an apparatus, a system, a storage medium, a computer program, and the like are also effective as a manner of the present invention.

Further, various components according to the present invention do not necessarily need to be an individually independent presence, and a plurality of components may be formed as one member, one component may be formed of a plurality of members, a certain component may be a part of another component, a part of a certain component and a part of another component may overlap each other, and the like.

Further, a plurality of procedures are described in an order in the method and the computer program according to the present invention, but the described order does not limit an order in which the plurality of procedures are executed. Thus, when the method and the computer program according to the present invention are executed, an order of the plurality of procedures can be changed within an extent that there is no harmful intent.

Furthermore, a plurality of procedures of the method and the computer program according to the present invention are not limited to being executed at individually different timings. Thus, another procedure may occur during execution of a certain procedure, an execution timing of a certain procedure and an execution timing of another procedure may partially or entirely overlap each other, and the like.

Advantageous Effects of Invention

According to each of the aspects described above, an appropriate passage method of a gate can be informed according to a situation of a user.

EXAMPLE EMBODIMENT

Hereinafter, example embodiments of the present invention will be described with reference to the drawings. Note that, in all of the drawings, a similar component has a similar reference sign, and description thereof will be appropriately not included. Further, in each of the following drawings, a configuration of a portion unrelated to essence of the present invention is not included and not illustrated.

"Acquisition" in an example embodiment includes at least one of acquisition (active acquisition), by its own apparatus, of data or information being stored in another apparatus or a storage medium, and inputting (passive acquisition) of data or information output from another apparatus to its own apparatus. Examples of the active acquisition include reception of a reply by making a request or an inquiry to another apparatus, reading by accessing another apparatus or a storage medium, and the like. Further, examples of the passive acquisition include reception of information to be distributed (transmitted, push-notified, or the like), and the like. Furthermore, "acquisition" may include acquisition by selection from among pieces of received data or pieces of received information, or reception by selecting distributed data or distributed information.

FIRST EXAMPLE EMBODIMENT

<System Outline>

Figure 1:
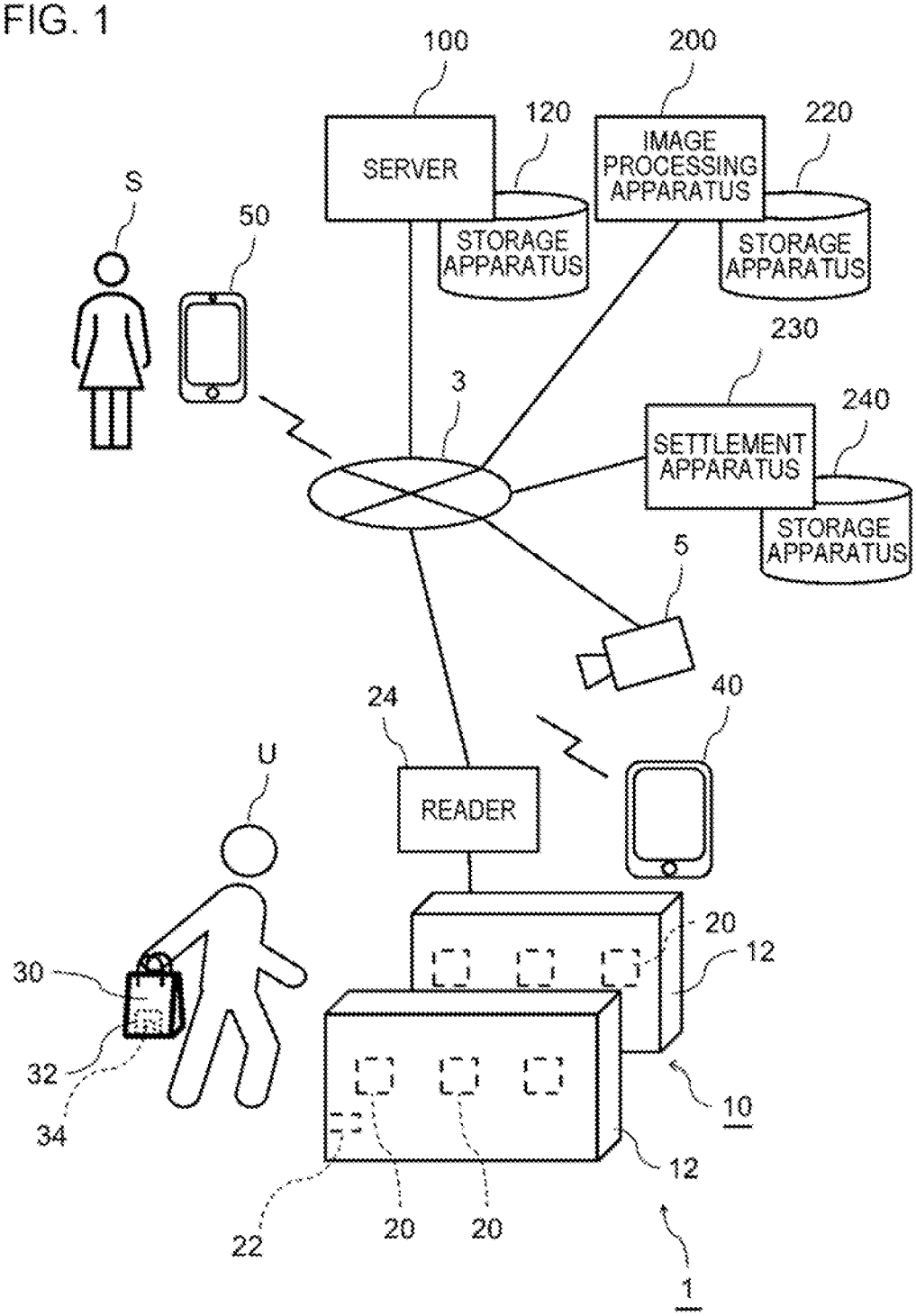
FIG. 1 is a diagram schematically illustrating a system configuration of a gate system according to an example embodiment of the present invention.

FIG. 1 is a diagram schematically illustrating a system configuration of a gate system 1 according to an example embodiment of the present invention. The gate system 1 includes a gate apparatus 10, a server 100, an image processing apparatus 200, a settlement apparatus 230, a gate terminal 40, and a staff terminal 50. Furthermore, the gate system 1 further includes a camera 5 and a reader 24.

The gate apparatus 10 is, for example, a walk-through gate provided at an exit of a store and the like. When a person U having a product 32 to be purchased passes through a passage 14 of the gate apparatus 10, product information is read from an RFID tag 34 provided to the product 32, and the settlement apparatus 230 performs settlement processing. The server 100 is an information processing apparatus according to the present example embodiment, and details will be described below.

The gate terminal 40 is provided on the gate apparatus 10, and performs guide display and the like for the person U who passes through the passage 14 of the gate apparatus 10. The camera 5 captures the person U who passes through the passage 14 of the gate apparatus 10, and generates an image. The image processing apparatus 200 processes the image generated by the camera 5. The staff terminal 50 is a terminal used by a staff member S of a store, and has a function of communicating, to the staff member S, a notification received from the server 100.

The server 100 includes a storage apparatus 120. The image processing apparatus 200 includes a storage apparatus 220. The settlement apparatus 230 includes a storage apparatus 240. However, the storage apparatus 120 may be an apparatus different from the server 100, may be an apparatus included inside the server 100, or may be a combination thereof.

The storage apparatus 220 stores a feature value of the person U to be made verification processing performed by the image processing apparatus 200. The storage apparatus 220 may be an apparatus different from the image processing apparatus 200, may be an apparatus included inside the image processing apparatus 200, or may be a combination thereof. The storage apparatus 240 stores various types of information needed for performing the settlement processing by the settlement apparatus 230. For example, the storage apparatus 240 may store information about a credit card to be used for the settlement processing by a user, and the like. The storage apparatus 240 may be an apparatus different from the settlement apparatus 230, may be an apparatus included inside the settlement apparatus 230, or may be a combination thereof.

Hardware Configuration Example

Figure 2:
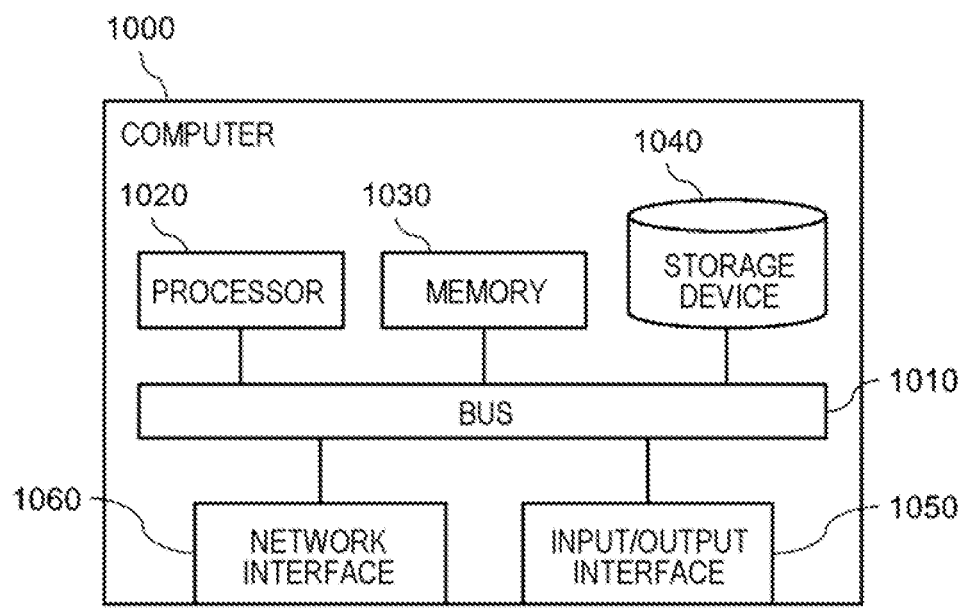
FIG. 2 is a block diagram illustrating a hardware configuration of a computer that achieves an information processing apparatus described below.

FIG. 2 is a block diagram illustrating a hardware configuration of a computer 1000 that achieves the information processing apparatus (server) 100 described below. The image processing apparatus 200, the settlement apparatus 230, the gate terminal 40, the staff terminal 50 in FIG. 1, and, furthermore, the reader 24, a store-entry terminal 60, an attended cash register 80, a user terminal 90, and the like that will be described below are also achieved by the computer 1000. Further, at least two of the server 100, the image processing apparatus 200, and the settlement apparatus 230 may be achieved by one computer, or each of the apparatuses may be achieved by two computers. In other words, the server 100, the image processing apparatus 200, and the settlement apparatus 230 may be included in the same apparatus, or may be different apparatuses.

The image processing apparatus 200 and the settlement apparatus 230 are achieved by a personal computer, a server computer, and the like.

The gate terminal 40 is, for example, a tablet terminal, and includes a touch panel having a function as a display unit and an operation unit, an operation reception unit such as a switch, a sound input/output unit (a speaker and a microphone), and a camera.

The staff terminal 50 is, for example, a smartphone, a tablet terminal, a cellular phone, a personal digital assistant (PDA), a personal computer, and the like, and includes a touch panel having a function as a display unit and an operation unit, an operation reception unit such as a switch, a sound input/output unit (a speaker and a microphone), and a vibration unit.

The computer 1000 includes a bus 1010, a processor 1020, a memory 1030, a storage device 1040, an input/output interface 1050, and a network interface 1060.

The bus 1010 is a data transmission path for allowing the processor 1020, the memory 1030, the storage device 1040, the input/output interface 1050, and the network interface 1060 to transmit and receive data with one another. However, a method of connecting the processor 1020 and the like to each other is not limited to bus connection.

The processor 1020 is a processor achieved by a central processing unit (CPU), a graphics processing unit (GPU), and the like.

The memory 1030 is a main storage apparatus achieved by a random access memory (RAM) and the like.

The storage device 1040 is an auxiliary storage apparatus achieved by a hard disk drive (HDD), a solid state drive (SSD), a memory card, a read only memory (ROM), or the like. The storage device 1040 stores a program module that achieves each function (for example, a reading result acquisition unit 102, a detection result acquisition unit 104, an output processing unit 106, a storage processing unit 110, a determination unit, and the like described below) of the information processing apparatus (server) 100. The processor 1020 reads each program module onto the memory 1030 and executes the program module, and each function associated with the program module is achieved. Further, the storage device 1040 may also store each piece of data of the storage apparatus 120 of the server 100, the storage apparatus 220 of the image processing apparatus 200, and the storage apparatus 240 of the settlement apparatus 230.

The program module may be stored in a storage medium. The storage medium that stores the program module may include a non-transitory tangible medium usable by the computer 1000, and a program code readable by the computer 1000 (the processor 1020) may be embedded in the medium.

The input/output interface 1050 is an interface for connecting the computer 1000 and various types of input/output equipment. The input/output interface 1050 also functions as a communication interface that performs short-range wireless communication, such as Bluetooth (registered trademark) and Near Field Communication (NFC).

The network interface 1060 is an interface for connecting the computer 1000 to a communication network. The communication network is, for example, a local area network (LAN) and a wide area network (WAN). A method of connection to the communication network by the network interface 1060 may be wireless connection or wired connection.

Then, the computer 1000 is connected to necessary equipment (for example, the touch panel, the speaker, the microphone, the camera, and the like for the gate terminal 40) via the input/output interface 1050 or the network interface 1060.

<Gate Apparatus 10>

The gate apparatus 10 includes two housings 12 that determine the passage 14 passed by the person U. The housing 12 extends at a predetermined distance from an entrance to an exit of the passage 14 passed by the person U. The two housings 12 are installed in parallel with each other at an interval on both sides of the passage 14. The two housings 12 are preferably installed side by side.

The gate apparatus 10 includes an antenna 20 that communicates with the radio frequency (RF) ID tag 34 provided to the product 32 and the like carried by the person U who passes through the passage 14, and the reader 24 that reads product information transmitted on an electric wave being received from the RFID tag 34 by the antenna 20. A plurality of the antennas 20 are aligned in the housing 12 in a traveling direction of the passage 14, and read product information from the RFID tag 34 while the person U walks through the passage 14. At least two housings 12 or components included in the housing 12 may be electrically connected to each other. Thus, the plurality of antennas 20 provided in each of the housings 12 can operate in cooperation.

In this example, the reader 24 transmits the read product information to the settlement apparatus 230, and causes the settlement apparatus 230 to perform the settlement processing. A length (distance) of the passage 14 may be determined based on a walking velocity of the person U, an arrangement and an irradiation range of the antenna 20, reading accuracy of the RFID tag 34, and the like in such a way that product information can be read from the RFID tag 34 provided to the product 32 carried by the person U while the person U walks through the passage 14, for example.

The gate apparatus 10 includes a sensor 22 that detects presence of the person U on an entrance side of the passage 14 of the housing 12. For example, when the sensor 22 detects presence of the person U, the antenna 20 starts reading the RFID tag 34 provided to the product 32 carried by the person U.

<RFID Tag 34>

The RFID tag 34 includes an antenna and an IC chip that are not illustrated. The IC chip includes a memory and a communication unit. The communication unit performs, via the antenna, wireless communication with the antenna 20 of the apparatus that reads the RFID tag 34. The memory is a readable/writable memory device, and product information about the product 32 is written in the memory in this example. In this example, the product information is not particularly limited, but includes at least information (for example, a product code, a product price, or the like) needed for performing the settlement processing of the product 32 to be purchased by the person U.

When the antenna 20 emits an electric wave toward the passage 14, the RFID tag 34 that receives the electric wave transmits, on the electric wave, product information in the memory. The antenna 20 receives the electric wave. The reader 24 reads the product information from the electric wave received by the antenna 20. Thus, as long as the RFID tag 34 does not get inside an irradiation range of the electric wave transmitted from the antenna 20, the antenna 20 cannot read the information of the RFID tag 34.

The irradiation range of the electric wave transmitted from the antenna 20 is a space to a height of the housing 12 above the passage 14 between the two housings 12. In other words, product information cannot be read from the RFID tag 34 present at a place other than the space. Thus, when the person U who passes through the gate holds the product 32 high, the gate system 1 causes the gate terminal 40 to announce to the person U to lower a position of the product 32 in such a way that the RFID tag 34 can be read.

<Camera 5 and Image Processing Apparatus 200>

The camera 5 includes a lens and a capturing element such as a charge coupled device (CCD) image sensor, and is, for example, a network camera such as an Internet protocol (IP) camera. The network camera has, for example, a wireless local area network (LAN) communication function, and is connected to the server 100 and the image processing apparatus 200 via a communication network 3, i.e., a relay apparatus (not illustrated) such as a router. A plurality of the cameras 5 may be installed in a store. The camera 5 may include a mechanism for performing control of an orientation of a camera main body and a lens, zooming control, focusing control, and the like by following a movement of a person.

As a camera that acquires an image for performing biometric authentication processing of the person U, the camera included in the gate terminal 40 may be used.

An image generated by the camera 5 is preferably captured in real time and transmitted to the image processing apparatus 200. However, an image transmitted to the image processing apparatus 200 may not be directly transmitted from the camera 5, and may be an image delayed by a predetermined time. An image captured by the camera 5 may be once stored in another storage apparatus (not illustrated), and may be read by the image processing apparatus 200 from the storage apparatus successively or by each predetermined interval. Furthermore, an image transmitted to the image processing apparatus 200 preferably a moving image, but may be a frame image by each predetermined interval or may be a still image.

As described below, the image processing apparatus 200 processes an image generated by the camera 5, and determines a position of a product included in the image and performs skeleton estimation processing of the person U included in the image.

Functional Configuration Example

Figure 3:
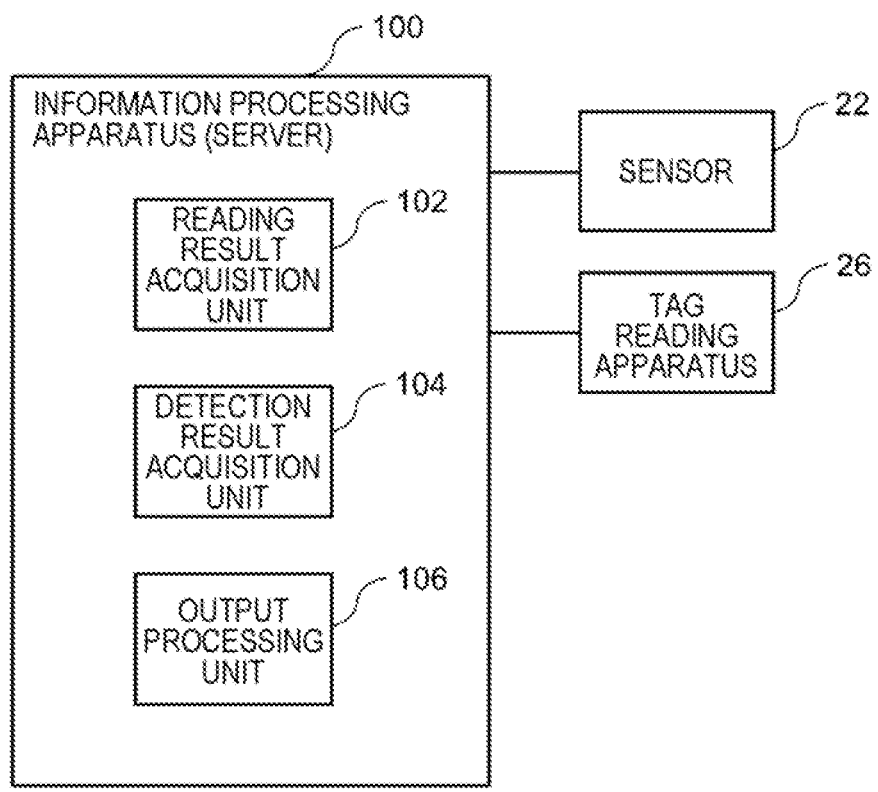
FIG. 3 is a functional block diagram illustrating a logical configuration example of the information processing apparatus according to the present example embodiment.

FIG. 3 is a functional block diagram illustrating a logical configuration example of the information processing apparatus (server) 100 according to the present example embodiment.

The server 100 includes the reading result acquisition unit 102, the detection result acquisition unit 104, and the output processing unit 106. The reading result acquisition unit 102 acquires a reading result from a gate (gate apparatus 10) including a reading unit which reads a wireless communication tag (RFID tag 34) provided to the product 32. The detection result acquisition unit 104 acquires a detection result from a detection unit for detecting the person U who passes through the gate. The output processing unit 106 causes an output unit (gate terminal 40) to perform a predetermined output when there is no reading of the RFID tag 34 within a predetermined period around a timing at which the detection unit detects the person U.

The reading unit (indicated as a "tag reading apparatus 26) in FIG. 3) of the RFID tag 34 includes the antenna 20 provided in the housing 12 of the gate apparatus 10, and the reader 24 that reads product information received by the antenna 20.

One example of the detection unit is the sensor 22 provided in the housing 12 of the gate apparatus 10. The sensor 22 is, for example, an infrared sensor.

A case where there is no reading of the RFID tag 34 within a predetermined period around a timing at which the detection unit detects the person U indicates a situation where the RFID tag 34 of the product 32 that should be carried by the person U who enters the gate cannot be correctly read due to some sort of circumstance while the person U walks on the passage 14 (predetermined period).

Reasons for the situation where the RFID tag 34 cannot be read are exemplified below, which are not limited thereto.

(Reason 1) The person U does not have the product 32 being a purchase target.

(Reason 2) The RFID tag 34 of the product 32 is located outside the gate and is not located in the irradiation range of the electric wave transmitted from the antenna 20.

(Reason 3) An orientation of the RFID tag 34 of the product 32 does not match directivity of the antenna 20, and thus the RFID tag 34 cannot be detected.

(Reason 4) The electric wave transmitted from the antenna 20 is shielded due to the RFID tag 34 of the product 32 being held with a hand of the person U and the like.

One example of the output unit is at least one of the display and the speaker of the gate terminal 40 provided on the gate apparatus 10. Another example of the output unit is at least one of the display, the speaker, and the vibration unit of the staff terminal 50 of the staff member S.

A predetermined output being output from the output unit by the output processing unit 106 is exemplified below, which is not limited thereto. A plurality of output examples below may be combined.

Output Example A1

At least one of an image and a sound of guidance that informs the person U of a correct passage method of a gate, and an image, a sound, and a notification sound that inform the person U that a passage method of a gate is not correct is output to the gate terminal 40.

Output Example A2

At least one of an image and a sound of a message, and a notification sound, that notify presence of a customer (person U) who needs help is output to the staff terminal 50.

Output Example A3

At least one of an image, a sound, and a notification sound that inform a possibility of occurrence of dishonest behavior of the person U is output to the staff terminal 50 and a management center (not illustrated).

Operation Example

Figure 4:
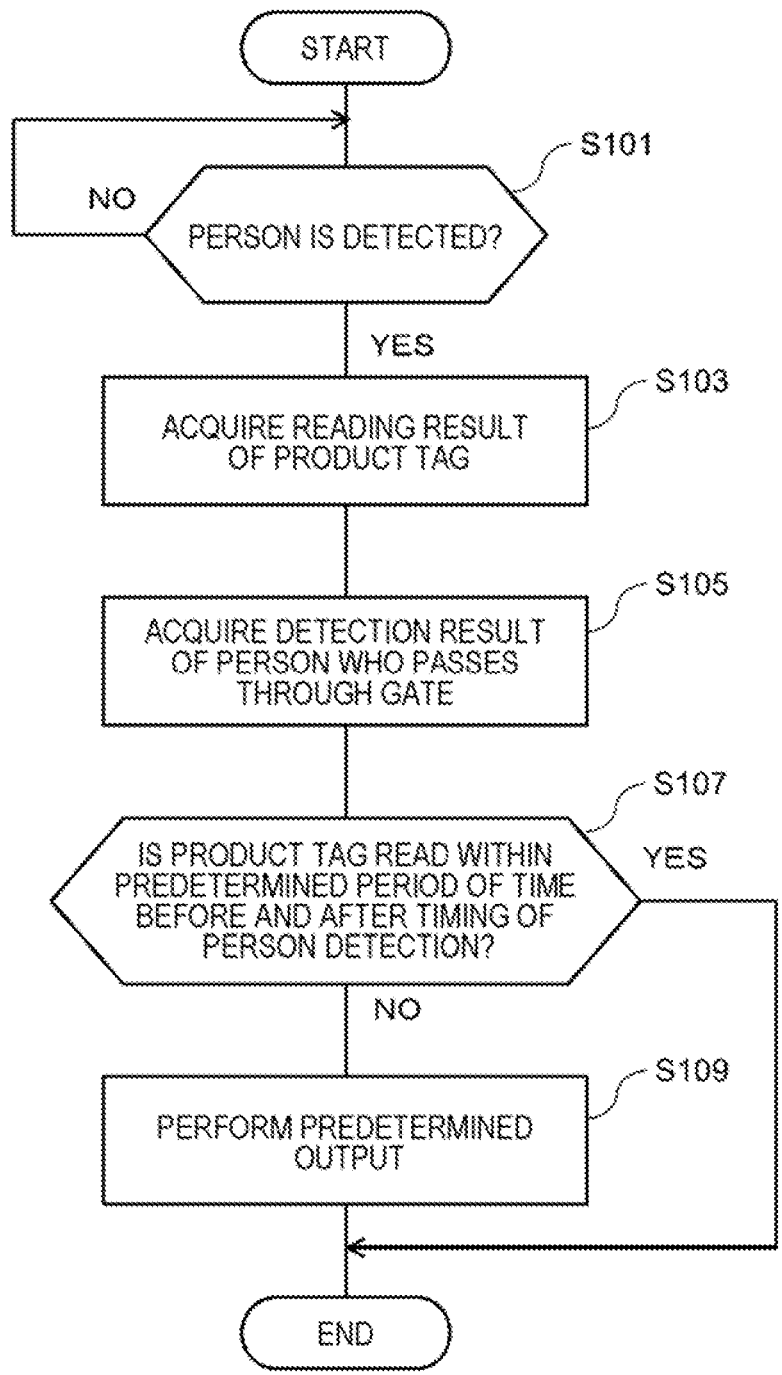
FIG. 4 is a flowchart illustrating an operation example of the information processing apparatus.

FIG. 4 is a flowchart illustrating an operation example of the information processing apparatus (server) 100.

First, when the detection result acquisition unit 104 acquires, from the sensor 22, information indicating that an entry of the person U is detected (step S101), the present processing starts. Then, the reading result acquisition unit 102 acquires a reading result of the RFID tag 34 of the product 32 from the reader 24 (step S103). Specifically, when the reader 24 can read product information from the RFID tag 34, the reading result acquisition unit 102 acquires the product information as a reading result. On the other hand, when the reader 24 cannot read product information, the reading result acquisition unit 102 acquires information indicating that the product information cannot be read, as a reading result, or does not acquire the product information.

Then, the detection result acquisition unit 104 acquires a detection result of the person U who passes through a gate (step S105). Specifically, the detection result acquisition unit 104 first acquires, from the sensor 22, a detection result indicating that the person U enters the gate. Next, the detection result acquisition unit 104 acquires, from the image processing apparatus 200, information indicating behavior of the person U who passes through the gate as a detection result. Details of the information indicating behavior of the person U will be described in a second embodiment described below.

Then, the output processing unit 106 determines presence or absence of reading of the RFID tag 34 of the product 32 within a predetermined period around a detection timing of the person U (step S107). When there is reading of the RFID tag 34 (YES in step S107), the present processing ends and proceeds to settlement processing that is not illustrated. When there is no reading of the RFID tag 34 (NO in step S107), a predetermined output is performed (step S109).

Specifically, guidance that informs a correct passage method of a gate is output to the gate terminal 40, and an output that notifies presence of the person U who needs follow-up at the gate is performed on the staff terminal 50. This is as exemplified in the output examples described above.

As described above, in the present example embodiment, the reading result acquisition unit 102 acquires a reading result of the RFID tag 34 of the product 32, and the detection result acquisition unit 104 acquires a detection result of the person U who passes through a gate. Then, the output processing unit 106 performs a predetermined output when there is no reading of the RFID tag 34 of the product 32 within a predetermined period around a detection timing of the person U.

With this configuration, in a case where the RFID tag 34 cannot be read due to the person U not passing by a correct method when the person U passes through a gate, guidance indicating a correct passage method can be output to the person U and the person U can be informed. Furthermore, a possibility of presence of the person U who cannot exhibit correct behavior at a gate can be notified to the staff terminal 50 of the staff member S. The staff member S receives the notification, goes to the gate, and can guide the person U to a correct passage method. Thus, reading accuracy of the RFID tag 34 of the product 32 carried by the person U can be improved.

Second Example Embodiment

Figure 5:
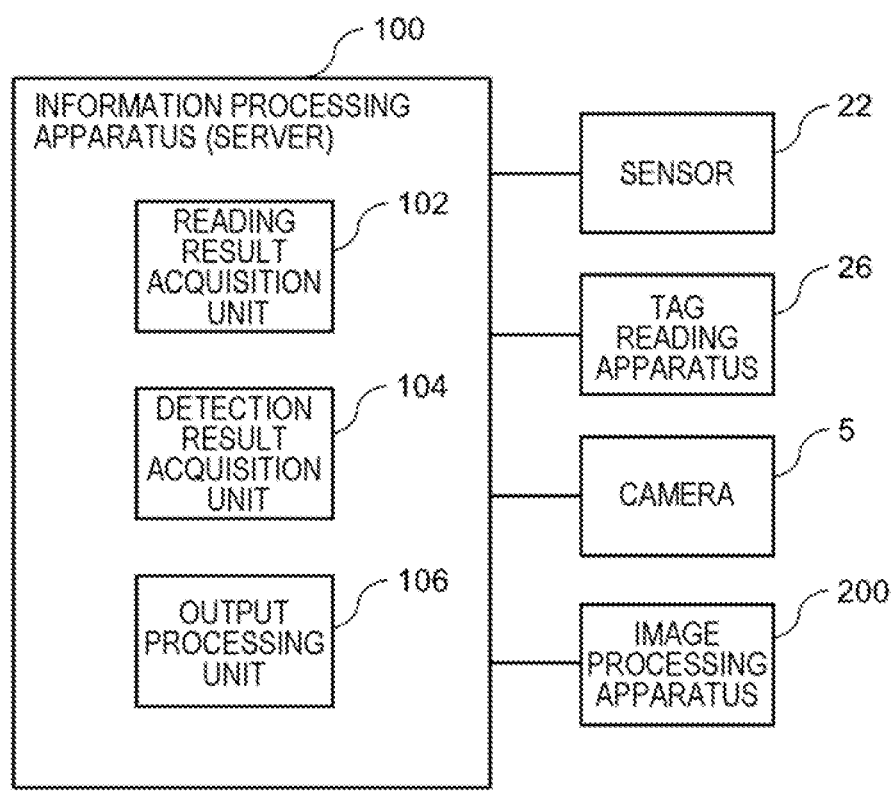
FIG. 5 is a functional block diagram illustrating a logical configuration example of the information processing apparatus.

FIG. 5 is a functional block diagram illustrating a logical configuration example of an information processing apparatus (server) 100. The present example embodiment is different from the example embodiment described above in a point that the present example embodiment further includes a camera 5 and an image processing apparatus 200 as a detection unit. The information processing apparatus (server) 100 has the same configuration as that in FIG. 3. However, the information processing apparatus (server) 100 is further connected to the camera 5 and the image processing apparatus 200. Note that, the configuration of the present example embodiment can be combined as long as the present example embodiment is not inconsistent with at least any one of configurations of other example embodiments.

In the present example embodiment described above, one example of the detection unit is the sensor 22 provided in the housing 12 of the gate apparatus 10. In the present example embodiment, the detection unit further includes the camera 5 that captures a person U who passes through a passage 14 of a gate apparatus 10, and the image processing apparatus 200 that processes an image captured by the camera 5. A plurality of the detection unit may be combined.

When the camera 5 and the image processing apparatus 200 are used as the detection unit, the image processing apparatus 200 detects that the person U enters the passage 14 of the gate apparatus 10 by using an image captured by the camera 5.

An output processing unit 106 distinguishes behavior of the person U by processing an image in which the person U is captured, and causes a first output to be performed when the behavior of the person U satisfies a first condition and causes a second output to be performed when the behavior of the person U satisfies a second condition.

The first output is an output of guidance that informs the person U of a passage method of the gate. The second output is an output that notifies a possibility of occurrence of dishonest behavior of the person U.

In other words, the first output includes an output of guidance that guides the person U to a correct passage method since there is no harmful intent in the behavior of the person U, and there is a possibility that the person U does not know a passage method and is at a loss. The second output includes an output of a message indicating a warning for stopping the person U from the behavior since there is a possibility that the person U means no harm in the behavior of the person U.

The image processing apparatus 200 processes an image captured by the camera 5, and distinguishes behavior of the person U who passes through the passage 14 of the gate apparatus 10. (a) The camera 5 and the image processing apparatus 200 that function as the detection unit described above and (b) the camera 5 and the image processing apparatus 200 that distinguish behavior of the person U who passes through the passage 14 may be the same apparatus or may be different apparatuses. For example, when the function (a) of detecting an entry of the person U is achieved, presence of a "person" may be simply able to be detected, and thus an image resolution can be reduced as compared to the case of (b). Further, since (b) distinguishes "behavior of a person", image analysis processing at a higher level needs to be performed than (a).

The image processing apparatus 200 in (b) first processes an image in which the person U who enters the gate apparatus 10 is captured, and estimates a skeleton of the person U. Then, the image processing apparatus 200 estimates a pose of the person U from the estimated skeleton. Behavior of a person to be a detection target is registered in advance as information about an associated pose in a storage apparatus 220. The image processing apparatus 200 verifies the registered information about the pose with the pose of the person U being estimated from the image. When the image processing apparatus 200 detects a pose having a degree of coincidence equal to or more than a threshold value, the image processing apparatus 200 determines that the person U exhibits the behavior associated with the pose.

Furthermore, the image processing apparatus 200 in (b) determines a position of a product 32 carried by the person U. For example, the image processing apparatus 200 distinguishes (a1) the product 32 being carried with a hand of the person U (particularly, an RFID tag 34 covered by a part of a body), (a2) the product 32 being located outside a housing 12, and the like.

The output processing unit 106 determines, by using an image, a position of the product 32 carried by a person, and causes an output unit to perform an output according to the position when the position of the product 32 is a specific position.

For example, when a position of the product 32 is too high, the output processing unit 106 causes a gate terminal 40 to output a message indicating that the RFID tag 34 cannot be read due to the position of the product 32 being too high or instructing to lower the position of the product 32.

For example, behavior of the person U is distinguished by whether the behavior satisfies a first condition or whether the behavior satisfies a second condition. The first condition includes a condition for determining that the RFID tag 34 cannot be read since the person U does not know a correct passage method of a gate. The second condition includes a condition for determining that the RFID tag 34 cannot be read since, for example, the person U intentionally prevents reading of the RFID tag 34 and attempts to acquire the product 32 in a dishonest manner.

Figure 6A:
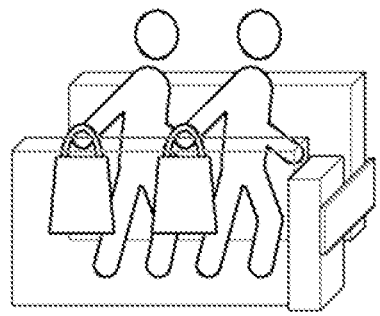
FIGS. 6A to 6C are diagrams each illustrating an example of behavior of a person being a detection target by an image processing apparatus.
Figure 6B:
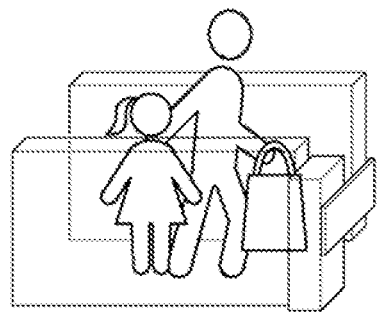
Figure 6C:
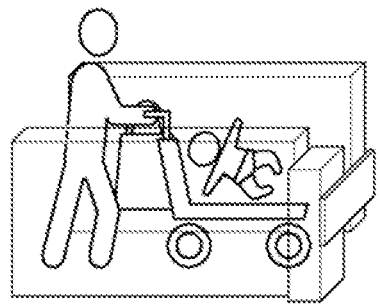

FIGS. 6 to 8 are diagrams illustrating an example of behavior of the person U being a detection target by the image processing apparatus 200. FIG. 6A illustrates an example (pattern A1) in which two or more adults enter a gate and pass through the gate. FIG. 6B illustrates an example (pattern A2) in which a plurality of persons such as a parent and a child enter a gate and pass through the gate. FIG. 6C illustrates an example (pattern A3) in which a person with a baby carriage, a suitcase, or the like enters a gate and passes through the gate. An entry into the gate apparatus 10 is basically one person at a time, and a plurality of persons are prohibited from entering together (so-called "tailgating"). However, an entry accompanied by a parent, a carer, and the like is not prohibited. Thus, as illustrated in FIGS. 6A to 6C, when a plurality of persons enter the gate apparatus 10 at the same time, the pattern A1 and the pattern A2 are distinguished.

Figure 7A:
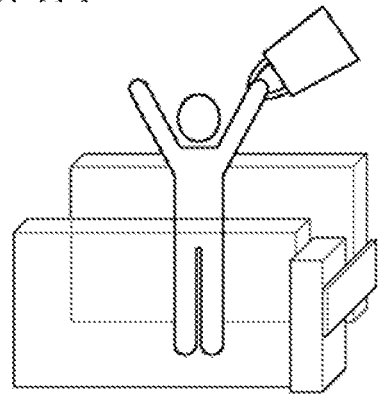
FIGS. 7A to 7F are diagrams each illustrating an example of behavior of a person being a detection target by the image processing apparatus.
Figure 7B:
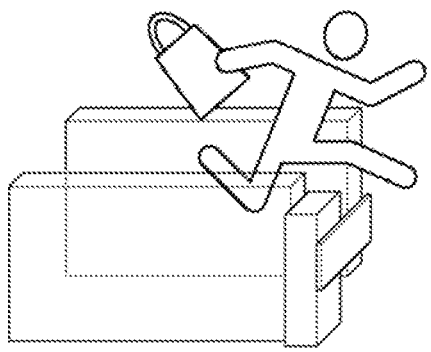
Figure 7C:
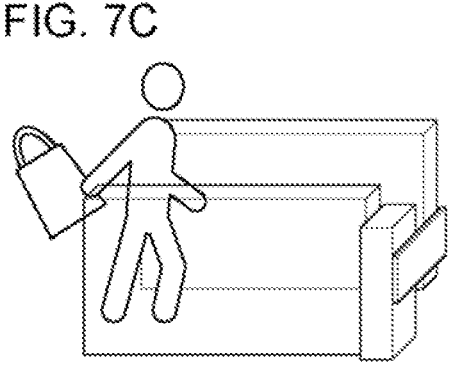
Figure 7D:
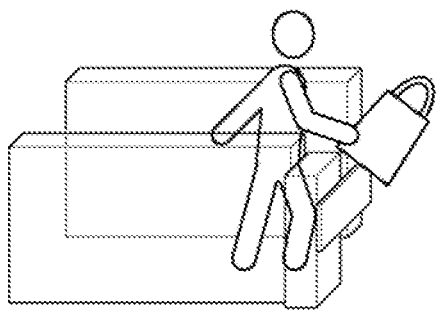
Figure 7E:
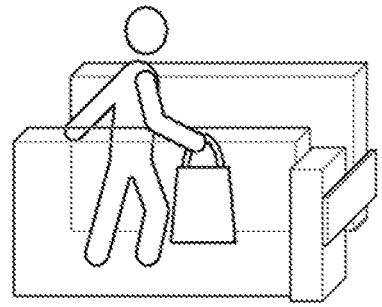
Figure 7F:
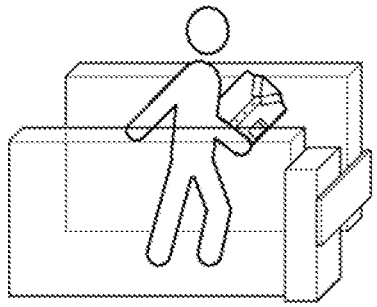

FIGS. 7A to 7F illustrate a pattern of a way of holding and a position of the product 32 in a gate. FIG. 7A illustrates an example (pattern B1) in which the product 32 is located above the gate. FIG. 7B illustrates an example (pattern B2) in which the person U jumps over a flapper gate provided on an exit side of the gate while the person U has the product 32. FIG. 7C illustrates an example (pattern B3) in which a body of the person U is present in the gate, but the product 32 is located outside a gate entrance of the housing 12. FIG. 7D illustrates an example (pattern B4) in which the body of the person U is present in the gate, but the product 32 is located outside a gate exit of the housing 12. FIG. 7E illustrates an example (pattern B5) in which the body of the person U is present in the gate, but the product 32 is located outside either the left or the right opposite to the passage 14 side of the housing 12. FIG. 7F illustrates an example (pattern B6) in which the person U has the product 32 with a hand without putting the product 32 in a bag. In the example in FIG. 7F, particularly, the person U takes a pose covering the RFID tag 34 of the product 32 with a hand, and thus the RFID tag 34 is in a state of being unable to be read.

Figure 8A:
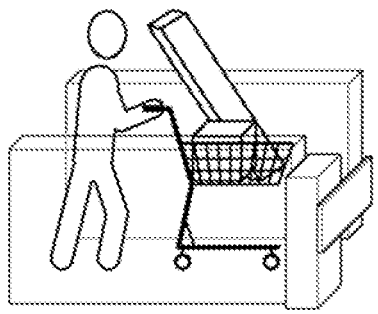
FIGS. 8A to 8D are diagrams each illustrating an example of behavior of a person being a detection target by the image processing apparatus.
Figure 8B:
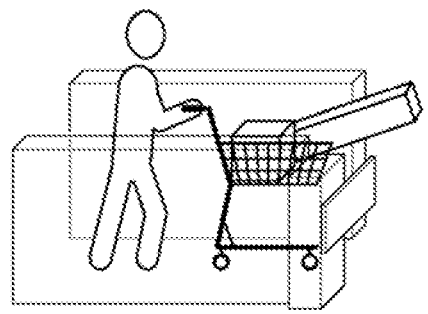
Figure 8C:
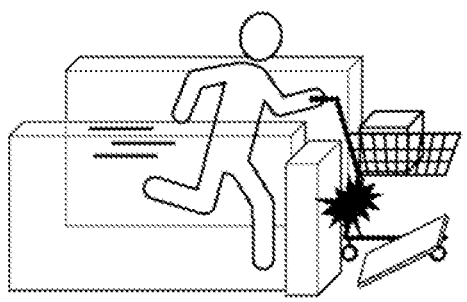
Figure 8D:
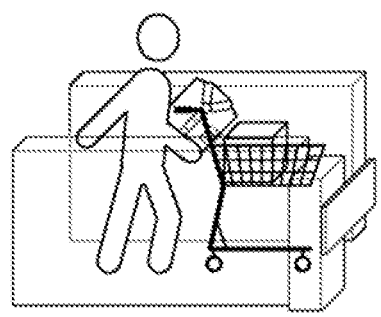

FIGS. 8A to 8D illustrate an example when the person U puts the product 32 in a cart and passes through a gate. FIG. 8A illustrates an example (pattern C1) in which the product 32 is located above the housing 12. FIG. 8B illustrates an example (pattern C2) in which the product 32 is located outside a gate exit of the housing 12. FIG. 8C illustrates an example (pattern C3) in which the person U attempts to pass through the gate by force. FIG. 8D illustrates an example (pattern C4) in which the person U holds a part of the product 32 with a hand. In the example in FIG. 8D, particularly, the person U takes a pose covering the RFID tag 34 of the product 32 with a hand, and thus the RFID tag 34 is in a state of being unable to be read.

Operation Example

Figure 9:
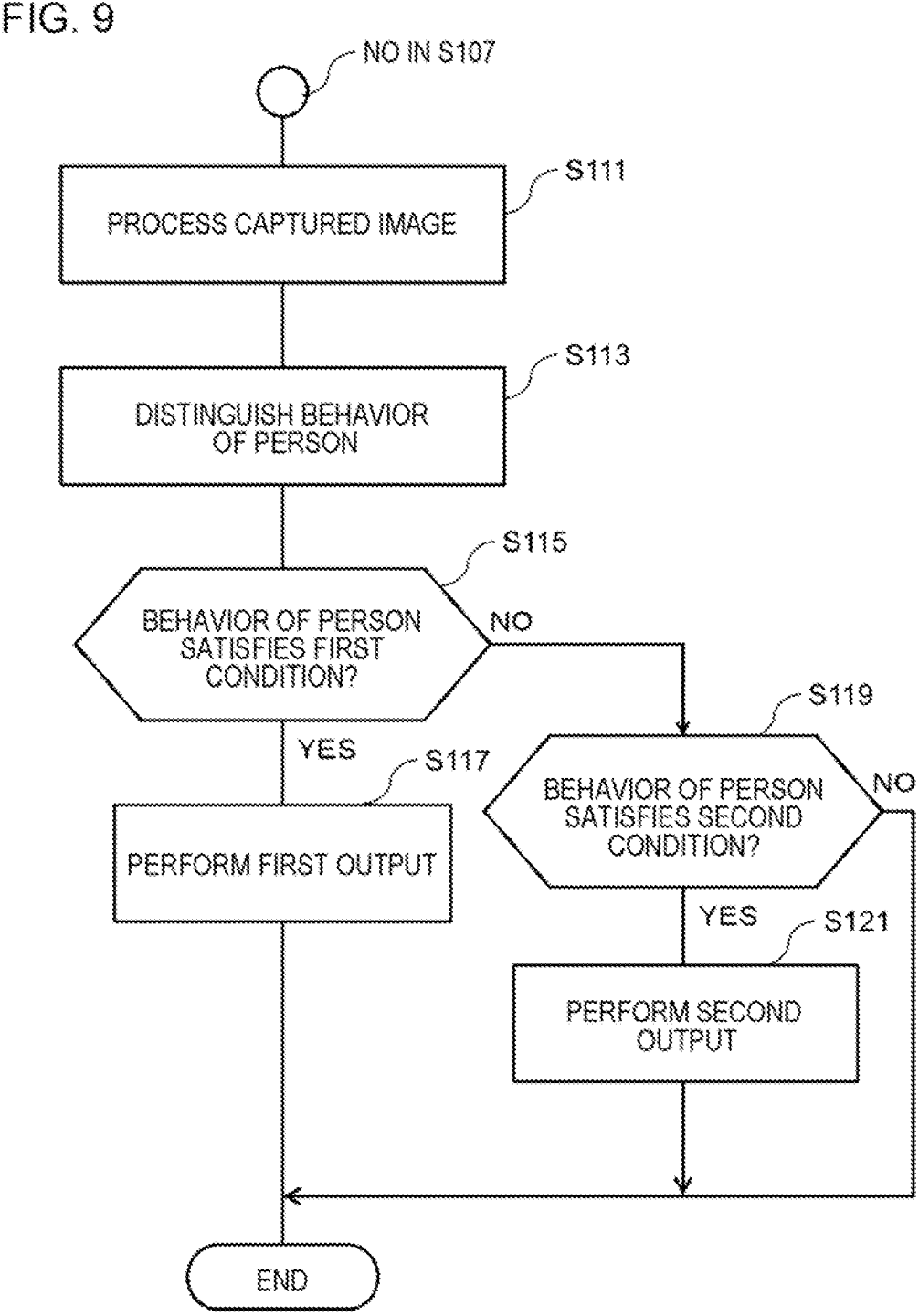
FIG. 9 is a flowchart illustrating an operation example of the information processing apparatus.

FIG. 9 is a flowchart illustrating an operation example of the server 100. The flowchart in FIG. 9 starts when the RFID tag 34 of the product 32 cannot be read within a predetermined period around a detection timing of the person U (NO in step S107) in step S107 in the flowchart in FIG. 4.

The image processing apparatus 200 processes an image generated by the camera 5 (step S111). The image processed herein preferably includes at least an image captured within the predetermined period around the timing at which the person U is detected by the sensor 22. Then, the image processing apparatus 200 distinguishes behavior of the person U in a gate being captured in the image (step S113). The output processing unit 106 determines whether the behavior of the person U satisfies a first condition (step S115) or whether the behavior of the person U satisfies a second condition (step S119), based on the distinction result by the image processing apparatus 200. Note that, in this example, both of the first condition and the second condition are determined, but at least one of the conditions may be determined.

When the behavior of the person U satisfies the first condition (YES in step S115), the output processing unit 106 causes the output unit to perform a first output (step S117). When the behavior of the person U does not satisfy the first condition (NO in step S115) and the behavior of the person U satisfies the second condition (YES in step S119), the output processing unit 106 causes the output unit to perform a second output (step S121). When the behavior of the person U does not satisfy the first condition (NO in step S115) and the behavior of the person U does not satisfy the second condition (NO in step S119), the processing bypasses step S117 and step S121, and the present processing ends and proceeds to settlement processing that is not illustrated.

Figure 10:
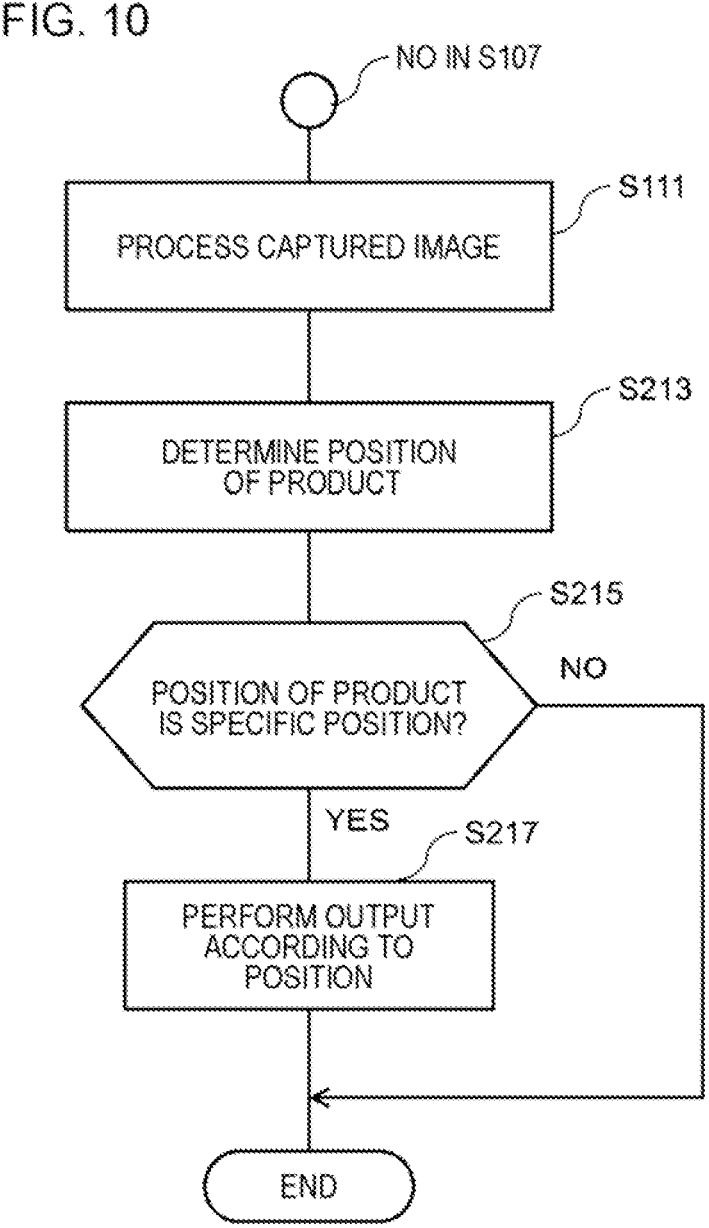
FIG. 10 is a flowchart illustrating another operation example of the information processing apparatus.

FIG. 10 is a flowchart illustrating another operation example of the server 100. The flowchart in FIG. 10 starts when the RFID tag 34 of the product 32 cannot be read within a predetermined period around a detection timing of the person U (NO in step S107) in step S107 in the flowchart in FIG. 4. Further, the flowcharts in FIGS. 9 and 10 may be performed simultaneously.

The image processing apparatus 200 processes an image generated by the camera 5 (step S111). Then, the image processing apparatus 200 determines (b1) the product 32 carried by the person U, (b2) a cart moving with the person U, and (b3) a position of the product 32 put in the cart, in a gate captured in the image (step S213).

Then, the output processing unit 106 determines whether the position of the product 32 is a specific position, based on the position of the product 32 and the like determined by the image processing apparatus 200 (step S215). The output processing unit 106 determines whether the position of the product 32 determined by the image processing apparatus 200 is a position of the product 32 of each of the patterns in FIGS. 7A to 7F described above. For example, when the position of the product 32 is located above the housing 12, the image processing apparatus 200 determines that the product 32 is lifted above the housing 12.

When the product 32 is located in the specific position (YES in step S215), the output processing unit 106 performs an output according to the position (step S217). When the product 32 is not located in the specific position (NO in step S215), the processing bypasses step S217, and the present processing ends and proceeds to the settlement processing that is not illustrated.

Figure 11A:
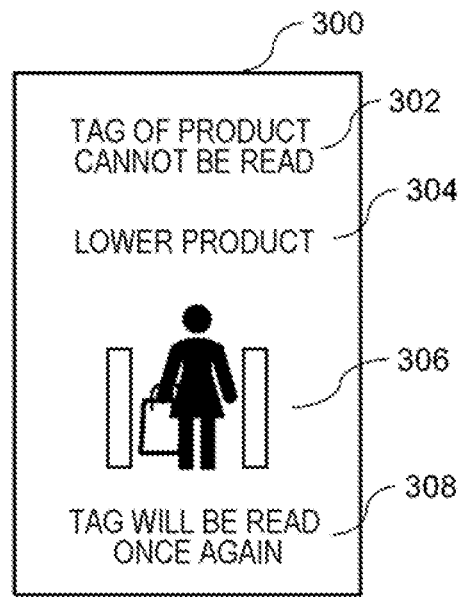
FIGS. 11A and 11B are diagrams each illustrating an example of a screen being displayed on a display of a gate terminal or a staff terminal according to the present example embodiment.
Figure 11B:
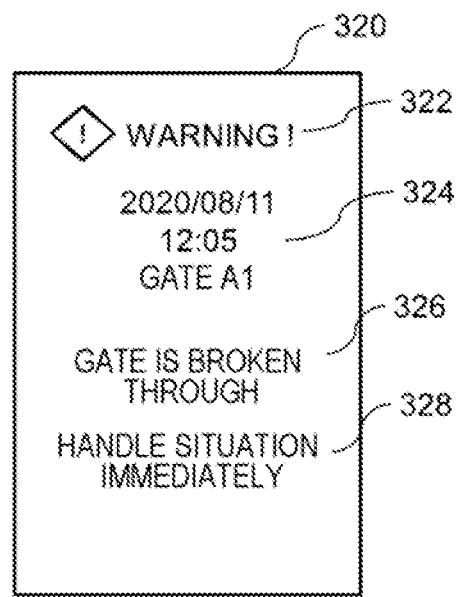

FIGS. 11A and 11B are diagrams each illustrating an example of a notification screen being displayed on a display of the gate terminal 40 or a staff terminal 50 according to the present example embodiment. FIG. 11A is a screen example being displayed on the display of the gate terminal 40. FIG. 11B is a screen example being displayed on the display of the staff terminal 50.

A screen 300 in FIG. 11A is one example of an output when the first condition is satisfied. The screen 300 is output to the display of the gate terminal 40 provided on the gate apparatus 10. The screen 300 includes, for example, a display portion 302 that displays a message informing that the RFID tag 34 of the product 32 cannot be read, a display portion 304 that displays a message indicating a correct way of holding and a correct position of the product 32 for the person U, a display portion 306 that illustrates an image indicating the correct way of holding and the correct position of the product 32, and a display portion 308 that displays a message informing the person U that reading of the RFID tag 34 is performed again.

A screen 320 in FIG. 11B is one example of an output when the second condition is satisfied. The screen 320 includes, for example, a display portion 322 that displays an icon and a message indicating occurrence of a problem in the gate apparatus 10, a display portion 324 indicating a date and time at which the problem occurs and identification information about a gate, a display portion 326 indicting a content of the occurring problem, and a display portion 328 indicating an instruction content to a staff member S.

In the present example embodiment, the image processing apparatus 200 processes a captured image of the person U who enters the gate apparatus 10, and distinguishes behavior of the person U and determines a position of the product 32, and thus a predetermined output is output from the output processing unit 106, based on the result. For example, when the product 32 is located outside a gate, the output processing unit 106 outputs guidance to the gate terminal in such a way as to place the product 32 in a space inside the gate apparatus 10.

According to the present example embodiment, an effect similar to that in the example embodiment described above can be achieved, and, furthermore, the person U can pass through a gate by a correct passage method according to a situation. In this way, the RFID tag 34 can be located in a position appropriate for reading, and thus reading accuracy of the RFID tag 34 can be improved. Furthermore, time required for reading can be shortened by improving the reading accuracy of the RFID tag 34, and thus time required for the settlement processing can also be shortened.

Third Example Embodiment

Figure 12:
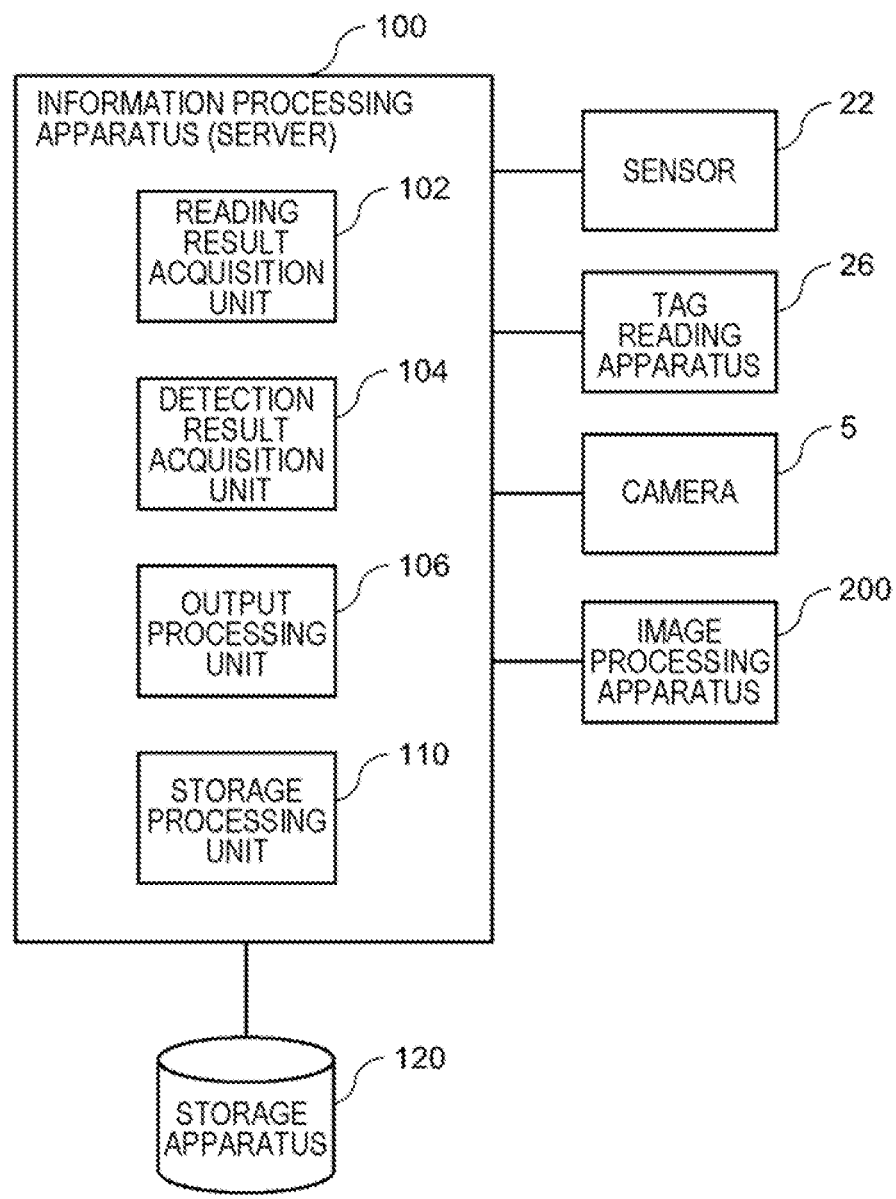
FIG. 12 is a functional block diagram illustrating a logical configuration of the information processing apparatus.

FIG. 12 is a functional block diagram illustrating a logical configuration of an information processing apparatus (server) 100. The information processing apparatus (server) 100 according to the present example embodiment is different from the second example embodiment described above in a point that the information processing apparatus (server) 100 according to the present example embodiment has a configuration for storing an image in which a person U is captured in a storage apparatus 120 when behavior of the person U satisfies a second condition. The information processing apparatus (server) 100 has the same configuration as that in FIG. 5, and further includes a storage processing unit 110. Further, the information processing apparatus (server) 100 is further connected to the storage apparatus 120. Note that, the configuration of the present example embodiment can be combined as long as the present example embodiment is not inconsistent with at least any one of configurations of other example embodiments. However, the storage apparatus 120 may be an apparatus different from the server 100, may be an apparatus included inside the server 100, or may be a combination thereof.

The storage processing unit 110 further stores an image of the person U in the storage apparatus 120 when behavior of the person U satisfies the second condition.

Figure 13:
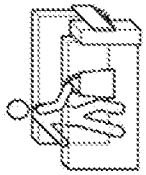
FIG. 13 illustrates an example of a table in which an output example of an output processing unit is associated by pattern of behavior of a person.

FIG. 13 illustrates an example of a table in which an output example of an output processing unit 106 is associated by pattern of behavior of the person U. In this example, behavior patterns of the person U are distinguished into (c1) harmless intent behavior, (c2) harmful intent behavior, and (c3) correct behavior.

The harmless intent behavior in (c1) includes the patterns A1, B1, B3, B5, C1, C2, and C4. The harmful intent behavior in (c2) includes the patterns B2, B4, B6, and C3. The correct behavior in (c3) includes the patterns A2 and A3.

In a case of being distinguished as the harmless intent behavior in (c1), the output processing unit 106 outputs guidance that guides a correct passage method to a gate terminal 40, and also outputs a notification that instructs help to a customer (person U) to a staff terminal 50 of a staff member S.

In a case of being distinguished as the harmful intent behavior in (c2), the storage processing unit 110 puts, on a blacklist, an image of the person U being captured by a camera 5, stores the image in the storage apparatus 120, and also outputs, to the staff terminal 50 of the staff member S, a notification that instructs action for causing the person U to exhibit correct behavior. The image of the person U stored in the storage apparatus 120 may include a feature value of an image of at least a part of the person U.

In the present example embodiment, when harmful intent behavior is detected, the storage processing unit 110 can put an image in which the person is captured on a blacklist, and store the image. Verification processing is performed on a visitor after that by using the list, and thus a person who has exhibited the harmful intent behavior before can also be detected at a time of a store entry.

While the example embodiments of the present invention have been described with reference to the drawings, the example embodiments are only exemplification of the present invention, and various configurations other than the above-described example embodiments can also be employed.

(Unregistered Person Detection Processing)

For example, when the person U uses a store that adopts a present gate system 1, an application for a walk-through gate can be installed in advance in a user terminal 90 of the person U. The user terminal 90 is, for example, a portable terminal such as a smartphone and a tablet terminal. In the application, a settlement means (including information about a credit card, and the like) to be use in the settlement processing can be registered in advance.

Then, the person U who does not use the application cannot use the walk-through gate, and thus needs to be prompted for accounting processing by an attended cash register. Thus, the server 100 may further include a decision unit (not illustrated) that decides whether the person U uses the application for the walk-through gate of the gate system 1.

Figure 14:
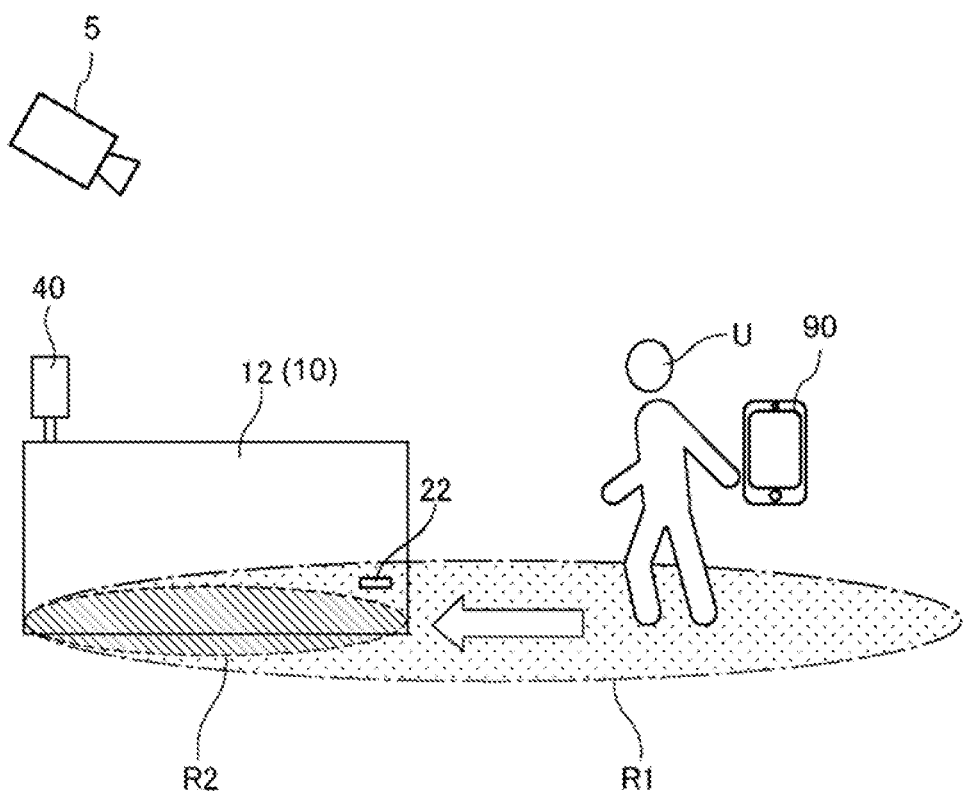
FIG. 14 is a diagram for describing an operation example of the gate system when a walk-through gate is passed by using an application.

FIG. 14 is a diagram for describing an operation example of the gate system 1 when a walk-through gate is passed by using an application. A beacon is transmitted from a beacon transmission apparatus (not illustrated) in a range R1 before an entry into a gate. When the person U approaches a housing 12 of a gate apparatus 10 with the application being activated in the user terminal 90, the application receives the beacon and responds to the beacon transmission apparatus (being one example of a detection unit).

A detection result acquisition unit 104 further acquires, as a detection result, reception of the response from the user terminal 90 by the beacon transmission apparatus. In other words, the detection result acquisition unit 104 acquires a detection result indicating that the person U having the user terminal 90 in which the application of the present gate system 1 is installed (activated) attempts to enter the gate apparatus 10.

Furthermore, a range in which a sensor 22 detects an entry of the person U into the gate apparatus 10 is a range indicated by R2 in FIG. 14. Further, the camera 5 may include, for example, the range R1 with a periphery of the gate apparatus 10 as a capturing range.

The detection result acquisition unit 104 acquires, from the image processing apparatus 200, a detection result (result 1) indicating whether the person U enters the capturing range R1 by the camera 5, and acquires, from the beacon transmission apparatus, a detection result (result 2) indicating whether the person U having the user terminal 90 in which the application of the present gate system 1 is installed (activated) enters the range R1.

Then, the decision unit decides whether the person U who enters the range R1 installs (activates) the application of the present gate system 1 in the user terminal 90, based on the detection results ((result 1) and (result 2)) being acquired by the detection result acquisition unit 104.

When the decision unit decides that the person U who enters the range R1 does not install (activate) the application of the present gate system 1 in the user terminal 90, the output processing unit 106 performs at least any one of outputs below. The plurality of outputs below may be combined within a consistent range.

(Output Example B1-1) A message notifying that an application needs to be installed for use of a walk-through gate is output to the gate terminal 40 of the gate apparatus 10.

(Output Example B1-2) Guidance indicating an installation method of needed application for use of a walk-through gate is output together with the output example B1-1 described above to the gate terminal 40 of the gate apparatus 10. Furthermore, code information such as a QR code (registered trademark) including a uniform resource locator (URL) of a Web site for downloading of an application may be displayed on the gate terminal 40.

(Output Example B2-1) Guidance prompting accounting processing to be performed in an attended cash register is output to the gate terminal 40 of the gate apparatus 10 when an application is not used.

(Output Example B2-2) A message notifying that a user who attempts to pass through the gate apparatus 10 without using an application is present is output to the staff terminal 50 of the staff member S. The message includes an instruction that follows (guides) the person U, and identification information (for example, information in which a place of the gate apparatus 10 is clear) about the gate apparatus 10.

When the decision unit decides that the person U who enters the range R1 installs (activates) the application of the present gate system 1 in the user terminal 90, the output processing unit 106 may perform at least any one of outputs below.

Guidance indicating a correct passage method of a walk-through gate is output to the gate terminal 40 of the gate apparatus 10. Furthermore, when the first condition described above is satisfied, guidance indicating a correct passage method of a gate associated with a behavior pattern in the gate terminal 40, for example, a position of a product and the like is output.

Furthermore, when the second condition described above is satisfied, that is, when the person U who exhibits harmful intent behavior is detected, the storage processing unit 110 puts, on a blacklist, an image of the person U being captured by the camera 5, and stores the image in the storage apparatus 120.

The blacklisted information may be shared to another store.

Further, for the person U decided who has the application of the present gate system 1 installed (activated) on the user terminal 90 face authentication processing may be performed by the image processing apparatus 200 by using an image captured by the camera 5 while the person U passes through the range R2. However, the face authentication processing may be performed in the gate terminal 40. The person U who passes through the range R2 may be captured by a camera of the gate terminal 40, and may be verified with a face image of a user being registered at a time of user registration or a feature value of the face image.

The authentication processing is not limited to face authentication, and an authentication apparatus using other biometric authentication information may perform the authentication processing. The biometric authentication information includes at least any one feature value such as an iris, a vein, an auricle, a fingerprint, a gait, and a size (such as a height, a shoulder width, a length from shoulder to hem, and a bone structure), for example. The authentication apparatus extracts a feature value of the biometric authentication information from an image captured by the camera 5, and performs the authentication processing.

The authentication processing may start over until accuracy of an authentication result is equal to or more than a threshold value by using a plurality of images or a plurality of frames being transmitted to the image processing apparatus 200. However, since the authentication processing uses an image captured when the person U passes through the passage 14, a limit is preferably imposed on the number of times or time in which the authentication processing starts over.

(Detection of Use of Salesroom of Expensive Product)

Figure 15:
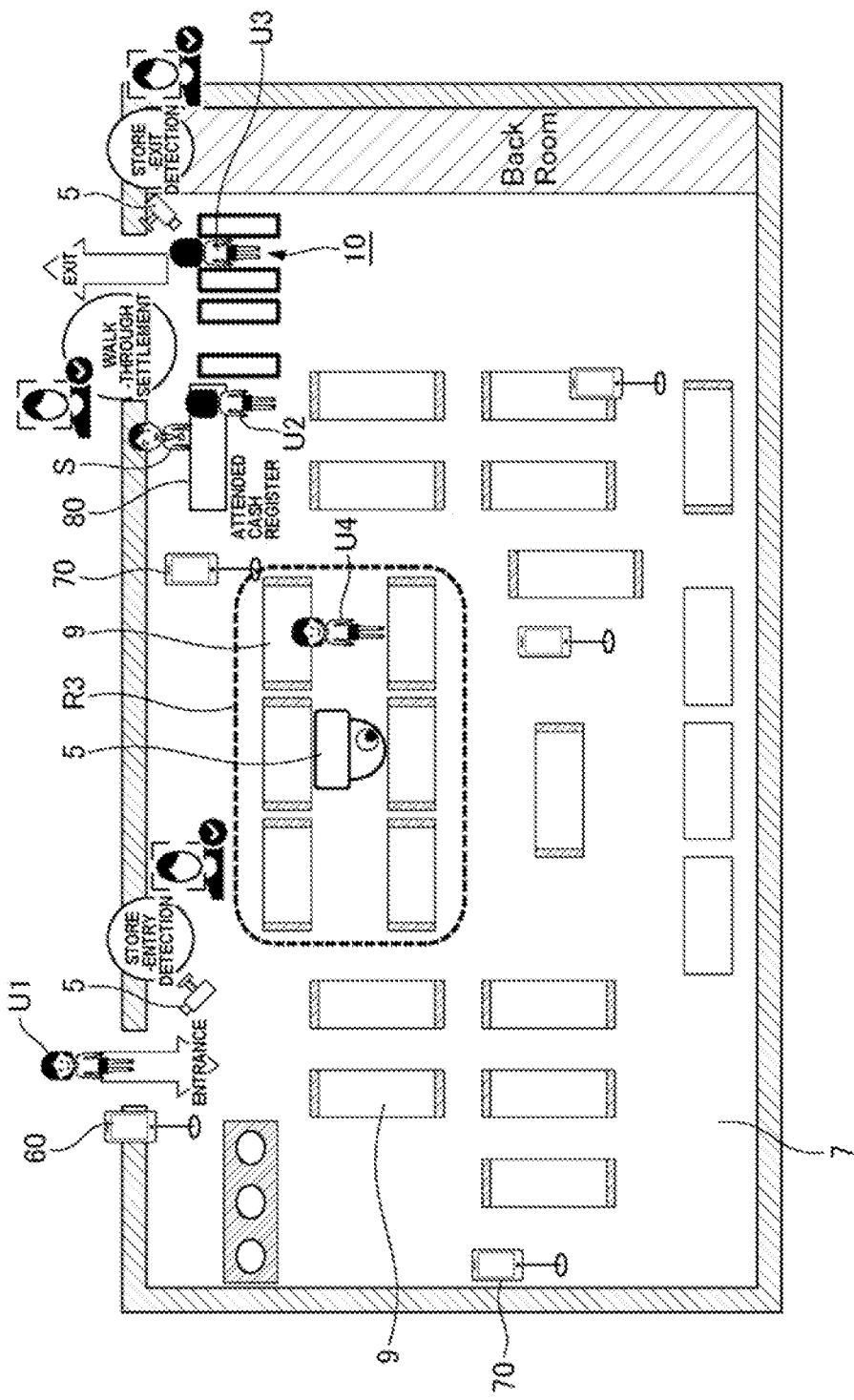
FIG. 15 is a diagram illustrating a layout of a store that adopts the gate system.

Furthermore, in the other example embodiment, the person U who drops by a salesroom of an expensive product and the like may be captured by the camera 5 in the gate apparatus 10 and stored in the storage apparatus 120. FIG. 15 is a diagram illustrating a layout of a store 7 that adopts the gate system 1. A store-entry terminal 60 may be provided at an entrance of the store 7. The person U may perform store-entry recording by operating the store-entry terminal 60 at a time of a store entry. For example, the store-entry recording of the person U may be performed by causing code information such as a QR code (registered trademark) indicating a user member of the store 7 to be displayed on the user terminal 90 of the person U, and reading the code information by the store-entry terminal 60. Alternatively, in a case of the person U who does not perform membership registration, the person U may be captured by the camera 5, and an image of the person U may be stored as a store-entry record in the storage apparatus 120.

For example, the camera 5 that tracks behavior of a user of the store 7 may be provided in the store 7. The person U who enters the store from the entrance may be tracked by the camera 5. At least one display shelf 9 is provided in the store 7. A product 32 is displayed on the display shelf 9. A user of the store 7 takes out the product 32 desired to be purchased from the display shelf 9, puts the product 32 in a bag 30 or a cart, and heads for the gate apparatus 10. Alternatively, the user may go to an attended cash register 80 and make the staff member S perform accounting processing.

The person U having the product 32 not subjected to the accounting processing can go to the gate apparatus 10, pass through the gate apparatus 10, and go outside the store 7. While the person U passes through the gate apparatus 10, product information is read from an RFID tag 34 of the product 32 and transmitted to a settlement apparatus 230, and settlement processing is performed. The processing is as described above.

Furthermore, in the store 7, the image processing apparatus 200 detects the person U who passes through a specific area R3, for example, a salesroom of an expensive product or a salesroom of a product having a high theft rate, or the person U who picks up an expensive product or a product having a high theft rate, based on a captured image of the camera 5.

The storage processing unit 110 makes a requiring check list of an image (at least a part of a body such as a face and clothing) of the detected person U and a feature value of the image, and stores the requiring check list in the storage apparatus 120.

The server 100 can select whether to store an image of the person U from a captured image of the camera 5 provided in a store, in response to behavior (for example, a movement of eyes and a line of sight, a manner, and the like) of the person U. The server 100 further includes a second detection unit (not illustrated) that causes the image processing apparatus 200 to estimate behavior of the person U by using a captured image of the camera 5, determines whether the estimated behavior of the person U is predetermined behavior (for example, suspicious behavior being suspected of shoplifting, such as turning back on a camera and looking around surroundings) of the person U, and detects the person U of the behavior. The storage processing unit 110 selects an image of the person U in which the predetermined behavior of the person U is detected, and stores the image in the storage apparatus 120.

The image processing apparatus 200 may perform verification processing between an image included in the requiring check list stored in the storage apparatus 120 and an image of a user of the store 7, and detect a store visit of the person U included in the requiring check list.

Furthermore, the output processing unit 106 causes the staff terminal 50 of an employee of a store to perform a predetermined output, based on information (second detection result) indicating the behavior of the person U in which the predetermined behavior of the person U is detected by the second detection unit, and information (detection result) indicating the behavior of the person U at a gate being acquired by a reading result acquisition unit 102.

The output processing unit 106 outputs, as the predetermined output, a message notifying that a user who requires a check is about to pass through the gate apparatus 10, a message instructing to go to the gate apparatus 10, and the like, for example. The message includes identification information (for example, information in which a place of the gate apparatus 10 is clear) about the gate apparatus 10.

The invention of the present application is described above with reference to the example embodiments and the examples, but the invention of the present application is not limited to the example embodiments and the examples described above. Various modifications that can be understood by those skilled in the art can be made to the configuration and the details of the invention of the present application within the scope of the invention of the present application.

Note that, when information about a user (person U) is acquired and used in the present invention, this is lawfully performed.

A part or the whole of the above-described example embodiment may also be described in supplementary notes below, which is not limited thereto.

1. An information processing apparatus, including:
   a reading result acquisition unit that acquires a reading result from a gate including a reading unit which reads a wireless communication tag provided to a product;
   a detection result acquisition unit that acquires a detection result from a detection unit which detects a person who passes through the gate; and an output processing unit that causes an output unit to perform a predetermined output when there is no reading of the wireless communication tag within a predetermined period around a timing at which the detection unit detects the person.

2. The information processing apparatus according to supplementary note 1, wherein
the detection unit includes a capturing unit.

3. The information processing apparatus according to supplementary note 1 or 2, wherein
the output processing unit distinguishes behavior of the person by processing an image in which the person is captured, and causes a first output to be performed when behavior of the person satisfies a first condition and causes a second output to be performed when behavior of the person satisfies a second condition.

4. The information processing apparatus according to supplementary note 3, wherein
the first output is an output of guidance informing the person of a passage method of the gate, and
the second output is an output notifying a possibility of occurrence of dishonest behavior of the person.

5. The information processing apparatus according to supplementary note 3 or 4, further including
a storage processing unit that further stores an image of the person in a storage unit when behavior of the person satisfies the second condition.

6. The information processing apparatus according to any one of supplementary notes 3 to 5, wherein
the output processing unit determines, by using the image, a position of a product carried by the person, and causes the output unit to perform an output according to the position when the position of the product is a specific position.

7. The information processing apparatus according to any one of supplementary notes 1 to 6, wherein
the output processing unit causes a terminal of an employee of a store to perform a predetermined output.

8. The information processing apparatus according to supplementary note 7, further including
a second detection result acquisition unit that acquires a second detection result from a second detection unit which detects a person in the store, wherein
the output processing unit causes the terminal of the employee of the store to perform a predetermined output, based on the detection result and the second detection result.

9. An information processing method, including,
by a computer:
acquiring a reading result from a gate including a reading unit which reads a wireless communication tag provided to a product;
acquiring a detection result from a detection unit which detects a person who passes through the gate; and
causing an output unit to perform a predetermined output when there is no reading of the wireless communication tag within a predetermined period around a timing at which the detection unit detects the person.

10. The information processing method according to supplementary note 9, wherein the detection unit includes a capturing unit.

11. The information processing method according to supplementary note 9 or 10, further including,
by the computer,
when causing the predetermined output to be performed,
distinguishing behavior of the person by processing an image in which the person is captured, and causing a first output to be performed when behavior of the person satisfies a first condition and causing a second output to be performed when behavior of the person satisfies a second condition.

12. The information processing method according to supplementary note 11, wherein the first output is an output of guidance informing the person of a passage method of the gate, and
the second output is an output notifying a possibility of occurrence of dishonest behavior of the person.

13. The information processing method according to supplementary note 11 or 12, further including,
by the computer,
further storing an image of the person in a storage unit when behavior of the person satisfies the second condition.

14. The information processing method according to any one of supplementary notes 11 to 13, further including,
by the computer,
when causing the predetermined output to be performed,
determining, by using the image, a position of a product carried by the person, and causing the output unit to perform an output according to the position when the position of the product is a specific position.

15. The information processing method according to any one of supplementary notes 9 to 14, further including,
by the computer,
when causing the predetermined output to be performed,
causing a terminal of an employee of a store to perform a predetermined output.

16. The information processing method according to supplementary note 15, further including,
by the computer:
acquiring a second detection result from a second detection unit for detecting a person in the store; and,
when causing the predetermined output to be performed,
causing the terminal of the employee of the store to perform a predetermined output, based on the detection result and the second detection result.

17. A program for causing a computer to execute:
a procedure of acquiring a reading result from a gate including a reading unit which reads a wireless communication tag provided to a product;
a procedure of acquiring a detection result from a detection unit which detects a person who passes through the gate; and
a procedure of causing an output unit to perform a predetermined output when there is no reading of the wireless communication tag within a predetermined period around a timing at which the detection unit detects the person.

18. The program according to supplementary note 17, wherein
the detection unit includes a capturing unit,
the program further causing a computer to execute
a procedure of acquiring the detection result from the capturing unit.

19. The program according to supplementary note 17 or 18, further including, in a procedure of causing the predetermined output to be performed, distinguishing behavior of the person by processing an image in which the person is captured, and causing a first output to be performed when behavior of the person satisfies a first condition and causing a second output to be performed when behavior of the person satisfies a second condition.

20. The program according to supplementary note 19, wherein the first output is an output of guidance informing the person of a passage method of the gate, and the second output is an output notifying a possibility of occurrence of dishonest behavior of the person.

21. The program according to supplementary note 19 or 20, further causing a computer to execute a procedure of further storing an image of the person in a storage unit when behavior of the person satisfies the second condition.

22. The program according to any one of supplementary notes 19 to 21, further including, in a procedure of causing the predetermined output to be performed, determining, by using the image, a position of a product carried by the person, and causing the output unit to perform an output according to the position when the position of the product is a specific position.

23. The program according to any one of supplementary notes 17 to 22, further including, in a procedure of causing the predetermined output to be performed, causing a terminal of an employee of a store to perform a predetermined output.

24. The program according to supplementary note 23, further causing a computer to execute:

a procedure of acquiring a second detection result from a second detection unit which detects a person in the store; and, in a procedure of causing the predetermined output to be performed, causing the terminal of the employee of the store to perform a predetermined output, based on the detection result and the second detection result.

REFERENCE SIGNS LIST

1 Gate system
3 Communication network
5 Camera
9 Display shelf
10 Gate apparatus
12 Housing
14 Passage
20 Antenna
22 Sensor
24 Reader
26 Tag reading apparatus
30 Bag
32 Product
34 RFID tag
40 Gate terminal
50 Staff terminal
60 Store-entry terminal
80 Attended cash register
90 User terminal
100 Server
100 Information processing apparatus
102 Reading result acquisition unit
104 Detection result acquisition unit
106 Output processing unit
110 Storage processing unit
120 Storage apparatus
200 Image processing apparatus
220 Storage apparatus
230 Settlement apparatus
240 Storage apparatus
300 Screen
320 Screen
1000 Computer
1010 Bus
1020 Processor
1030 Memory
1040 Storage device
1050 Input/output interface
1060 Network interface

What is claimed is:

1. An information processing apparatus comprising:
at least one memory storing instructions; and
at least one processor configured to execute the instructions to:
acquire a reading result from a gate including a reading unit which reads a wireless communication tag provided to a product;
acquire a detection result from a detection unit for detecting a person who passes through the gate;
cause an output unit to perform a predetermined output when there is no reading of the wireless communication tag within a predetermined period around a timing at which the detection unit detects the person; and
distinguish a behavior of the person by processing an image in which the person is captured, and cause a first output, as the predetermined output, to be performed when the behavior of the person satisfies a first condition and cause a second output, as the predetermined output, to be performed when the behavior of the person satisfies a second condition, wherein
the first output is an output of guidance informing the person of a position appropriate for reading the wireless communication tag provided to the product when the person passes through the gate with the product, and
the second output is an output notifying a possibility of occurrence of dishonest behavior of the person.

2. The information processing apparatus according to claim 1, wherein
the detection unit includes a capturing unit.

3. The information processing apparatus according to claim 1, wherein the at least one processor is further configured to execute the instructions to store an image of the person in a storage unit when the behavior of the person satisfies the second condition.

4. The information processing apparatus according to claim 1, wherein
the at least one processor is further configured to execute the instructions to determine, by using the image, a position of the product carried by the person, and cause the output unit to further perform a third output, as the predetermined output, according to the position when the position of the product is a specific position.

5. The information processing apparatus according to claim 1, wherein
the output unit is a terminal of an employee of a store to perform the predetermined output.

6. The information processing apparatus according to claim 5, wherein the at least one processor is further configured to execute the instructions to:
  acquire a second detection result from a second detection unit which detects a person in the store; and
  cause the terminal of the employee of the store to perform the predetermined output, based on the detection result and the second detection result.

7. The information processing apparatus according to claim 6, wherein
  the second detection result includes information indicating the behavior of the person in the store which is estimated by processing an image in which the person is captured in the store.

8. An information processing method performed by a computer and comprising:
  acquiring a reading result from a gate including a reading unit which reads a wireless communication tag provided to a product;
  acquiring a detection result from a detection unit which detects a person who passes through the gate;
  causing an output unit to perform a predetermined output when there is no reading of the wireless communication tag within a predetermined period around a timing at which the detection unit detects the person; and
  distinguishing a behavior of the person by processing an image in which the person is captured, and cause a first output, as the predetermined output, to be performed when the behavior of the person satisfies a first condition and cause a second output, as the predetermined output, to be performed when the behavior of the person satisfies a second condition, wherein
  the first output is an output of guidance informing the person of a position appropriate for reading the wireless communication tag provided to the product when the person passes through the gate with the product, and
  the second output is an output notifying a possibility of occurrence of dishonest behavior of the person.

9. The information processing method according to claim 8, wherein the detection unit includes a capturing unit.

10. The information processing method according to claim 8, further comprising:
  storing an image of the person in a storage unit when the behavior of the person satisfies the second condition.

11. The information processing method according to claim 8, further comprising:
  determining, by using the image, a position of the product carried by the person, and causing the output unit to further perform a third output, as the predetermined output, according to the position when the position of the product is a specific position.

12. The information processing method according to claim 8,
  wherein the output unit is a terminal of an employee of a store to perform the predetermined output.

13. The information processing method according to claim 12, further comprising:
  acquiring a second detection result from a second detection unit which detects a person in the store; and
  causing the terminal of the employee of the store to perform the predetermined output based on the detection result and the second detection result.

14. The information processing method according to claim 13, wherein
  the second detection result includes information indicating the behavior of the person in the store which is estimated by processing an image in which the person is captured in the store.

15. A non-transitory computer-readable storage medium storing a program executable by a computer to perform processing comprising:
  acquiring a reading result from a gate including a reading unit which reads a wireless communication tag provided to a product;
  acquiring a detection result from a detection unit which detects a person who passes through the gate;
  causing an output unit to perform a predetermined output when there is no reading of the wireless communication tag within a predetermined period around a timing at which the detection unit detects the person; and
  distinguishing a behavior of the person by processing an image in which the person is captured, and cause a first output, as the predetermined output, to be performed when the behavior of the person satisfies a first condition and cause a second output, as the predetermined output, to be performed when the behavior of the person satisfies a second condition, wherein
  the first output is an output of guidance informing the person of a position appropriate for reading the wireless communication tag provided to the product when the person passes through the gate with the product, and
  the second output is an output notifying a possibility of occurrence of dishonest behavior of the person.

* * * * *